(12) United States Patent
Büttner et al.

(10) Patent No.: US 8,234,427 B2
(45) Date of Patent: Jul. 31, 2012

(54) COMMUNICATION SYSTEM HAVING A MASTER/SLAVE STRUCTURE

(75) Inventors: Holger Büttner, Berlin (DE); Karl Weber, Altdorf (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 12/469,843

(22) Filed: May 21, 2009

(65) Prior Publication Data

US 2009/0292845 A1    Nov. 26, 2009

Related U.S. Application Data

(63) Continuation of application No. PCT/EP2007/062895, filed on Nov. 27, 2007.

(30) Foreign Application Priority Data

Nov. 27, 2006  (DE) .......................... 10 2006 055 887

(51) Int. Cl.
*G06F 13/00* (2006.01)
*G01R 31/08* (2006.01)

(52) U.S. Cl. ............ 710/110; 324/519; 370/15; 370/16; 340/825.05

(58) Field of Classification Search .................. 710/110; 324/519; 179/15; 370/15, 16; 340/825.05
See application file for complete search history.

(56) References Cited

U.S. PATENT DOCUMENTS

| | | | | |
|---|---|---|---|---|
| 3,652,798 A * | 3/1972 | McNeilly et al. | ............. | 370/224 |
| 4,530,085 A * | 7/1985 | Hamada et al. | ................ | 370/224 |
| 4,538,026 A * | 8/1985 | Yasue | ............................ | 178/2 R |
| 4,542,496 A * | 9/1985 | Takeyama et al. | ............ | 370/224 |
| 4,553,233 A * | 11/1985 | Debuysscher et al. | ........ | 370/224 |
| 4,573,044 A * | 2/1986 | McConachie et al. | ........ | 370/224 |
| 4,575,843 A * | 3/1986 | David et al. | .................. | 370/224 |
| 4,633,246 A * | 12/1986 | Jones et al. | .................... | 370/224 |
| 4,663,748 A | 5/1987 | Karbowiak et al. | | |
| 5,081,452 A | 1/1992 | Cozic | | |
| 5,623,482 A * | 4/1997 | Okanoue | ....................... | 370/224 |
| 6,104,723 A | 8/2000 | Martinson et al. | | |
| 6,233,704 B1 * | 5/2001 | Scott et al. | .................... | 714/717 |
| 6,574,192 B1 * | 6/2003 | Egnell | .......................... | 370/224 |
| 2001/0011892 A1 * | 8/2001 | Ropke | .......................... | 324/519 |
| 2003/0005368 A1 * | 1/2003 | Beer et al. | ....................... | 714/43 |
| 2004/0008720 A1 | 1/2004 | Wang et al. | | |
| 2005/0088982 A1 * | 4/2005 | Ying | ........................... | 370/294 |
| 2005/0111372 A1 * | 5/2005 | Koestner et al. | ............. | 370/248 |
| 2005/0129037 A1 * | 6/2005 | Zumsteg et al. | ............. | 370/404 |
| 2009/0222606 A1 * | 9/2009 | Janssen et al. | ................ | 710/110 |

FOREIGN PATENT DOCUMENTS

| | | |
|---|---|---|
| DE | 19745021 | 4/1998 |
| DE | 198 15 097 | 10/1999 |
| DE | 19832248 | 1/2000 |
| DE | 10312907 | 10/2004 |
| WO | WO 91/14324 | 9/1991 |
| WO | WO 2004/084451 | 9/2004 |
| WO | WO 2006/108527 | 10/2006 |

* cited by examiner

*Primary Examiner* — Paul R Myers
*Assistant Examiner* — Christopher A Daley
(74) *Attorney, Agent, or Firm* — Dorsey & Whitney LLP

(57) ABSTRACT

A communication system comprising a master unit and a plurality of slave units. In error mode, e.g. when a path error or a complete failure of a subscriber occurs, data transmission is carried out in a loop, starting from the master unit, via a first communication path and a second communication path.

9 Claims, 4 Drawing Sheets

COMMUNICATION SYSTEM HAVING A MASTER/SLAVE STRUCTURE

CROSS-REFERENCE TO RELATED APPLICATIONS

This application is a Continuation of PCT Application No. PCT/EP2007/062895 filed Nov. 27, 2007, which claims priority to German Patent Application No. 10 2006 055 887.1, filed Nov. 27, 2006, entitled "Communication System Having a Master/Slave Structure," the entire content of which is hereby incorporated by reference in its entirety.

BACKGROUND

The present invention relates to communication systems and methods, and, more particularly, to a communication system comprising a master/slave structure, to a master unit for such a communication system and to a method for operating a communication system comprising a master/slave structure.

In manufacturing and automation technology, serial bus systems are increasingly used in which peripherally arranged devices of a machine periphery such as I/O modules, transducers, drives, valves and user terminals communicate via an efficient real time communication system with automation, engineering and visualization systems. In this process, all subscribers are networked via a serial bus, e.g. a field bus, the data exchange via the bus being performed on the basis of the master/slave principle.

The active subscribers in the bus system, typically controlling devices, possess a bus access authorization and determine the data transfer on the bus. In the following, the active bus subscribers will be designated as the master units in the serial bus system. Passive bus subscribers, on the contrary, are generally peripheral machine devices. They do not have a bus access authorization, i.e. they can only accept received information signals or transmit information signals to a master unit upon request from the master unit. In the following, the passive bus subscribers will be named the slave units in the serial bus system.

Field bus systems comprising a master/slave structure are generally arranged in a ring topology to avoid complex wiring, whereby all bus subscribers are connected to a ring-shaped transmission path. A data signal generated by the master unit is fed into the ring-shaped transmission path by the master unit and consecutively cycles through the slave units serially connected to the ring-shaped transmission path to be again received and evaluated by the master unit.

The data signals are usually organized as data packets by the master unit, the data packets being composed of control data and user data, whereby the Ethernet standard is employed allowing for data packets with a length of up to 1500 byte at a simultaneously high transmission rate of 100 Mbit/sec. Each of the slave units connected to the ring-shaped transmission path then processes the user data of the Ethernet telegrams intended for it, the user data being fed into the ring-shaped transmission path by the master unit.

The master/slave communication systems comprising a ring structure are typically configured in such a way that the master unit comprises a transmitting unit as a data launching point and a receiving unit as a data lifting point. The individual slave units are then connected at the transmission path to form a ring, whereby each subscriber is connected to two neighbours and the first and the last subscriber in the ring is connected to the master unit. The transmission of the data packets is thereby carried out in one direction starting from the master unit via its transmitting unit to the first connected slave unit and from there to the next one up to the last slave unit in the ring in the direction of the data, and then back to the receiving unit of the master unit.

To receive the cycling data packets from the previous subscriber, each slave unit comprises a first terminal and a second terminal for forwarding to the subsequent subscriber, a processing unit being arranged between the two terminals to process the data packets cycling through the slave unit.

A critical requirement set for the master/slave communication system, particularly for use in manufacturing and process automation, is a high failure tolerance, i.e. the ability of the communication system to perform the desired function, e.g. manufacturing a work piece, in spite of the occurrence of a failure. Failures in the communication system that have to be dealt with out affecting the manufacturing process comprise, apart from failures in the data packets, particularly the failure of a subscriber in the transmission path and/or an interruption of the transmission path, e.g. by physically cutting through the transmission medium.

To achieve a failure-tolerant master/slave communication system, particularly in the case of link failures, i.e. if entire transmission sections fail, double-ring structures are frequently used. U.S. Pat. No. 4,663,748 thus describes a communication system comprising a master/slave structure in which the master unit is serially connected to a plurality of slave units via two communication paths operating in contra-sense. The master unit thereby comprises two transmitting and receiving units comprising respective transmitters and/or receivers and associated control units to allow for data packets to simultaneously cycle through the two communication paths. The slave unit then comprises a coupling unit to reconfigure the communication system if a link failure occurs, e.g. in the case of a broken communication line, by monitoring the data packets on the two communication paths and by respective switching, reconfiguration taking place in such a way that a failure of a larger section of the communication system caused by the link failure, or even a complete failure, may be prevented.

Failure-tolerant master/slave communication systems having a double-ring structure in which the master unit comprises two respective transmitting and receiving units having corresponding transmitters and/or receivers and associated control units to launch data packets on both communication paths, provide a higher hardware and switching complexity of the master unit and thus considerably increase costs.

SUMMARY

It is an object of the present invention to provide a communication system having a master/slave structure, a master unit for such a communication system and a method for operating a communication system having a master/slave structure, allowing for a real time reconfiguration of the master/slave structure if link failures occur, involving a minimum of hardware and switching complexity.

In one embodiment, the present invention comprises a communication system comprising a master unit and a plurality of slave units, wherein, in an error mode, e.g. when a path error or a complete failure of a subscriber occurs, data transmission is carried out in a loop, starting from the master unit, via a first communication path and a second communication path.

In one embodiment, the present invention comprises a communication system comprising a master unit and a plurality of slave units, wherein the master unit and the slave units each comprise two first terminals connected to a first communication path and two second terminals connected to a second communication path, wherein the first terminals of the master unit and the slave units are connected via the first communication path to form a first ring structure, wherein the second terminals of the master unit and the slave unit are connected via the second communication path to form a second ring structure, each slave unit comprising a slave coupling unit short-circuiting the first communication path and the second communication path between the first terminals and the second terminals in the slave unit in a failure mode, the master unit comprising a transmitting unit connected to the one first terminal for sending data signals, a receiving unit connected to the other first terminal for receiving data signals, and a master coupling unit short-circuiting the two second terminals in the failure mode.

In one embodiment, the present invention comprises a master unit comprising two first terminals connected to a first communication path, two second terminals connected to a second communication path, a transmitting unit connected to the one first terminal for transmitting data signals, a receiving unit connected to the other first terminal for receiving data signals, and a master coupling unit short-circuiting the two second terminals in a failure mode.

In one embodiment the present invention comprises a method for operating a communication system comprising a master unit and a plurality of slave units, the master unit and the slave units each comprising two first terminals connected to a first communication path and two second terminals connected to a second communication path, the first terminals of the master unit and of the slave units being connected via the first communication path to form a first ring structure, the second terminals of the master unit and of the slave units being connected via the second communication path to form a second ring structure, a ring-shaped data transmission being carried out in normal operation mode via the first communication path starting from the one first terminal of the master unit to the first slave unit connected via the first communication path in the direction of data transmission, from there to the next slave unit connected via the first communication path in the direction of data transmission up to the last slave unit connected via the first communication path in the direction of data transmission and then on to the further first terminal of the master unit, a loop-shaped data transmission being performed in a failure mode via the first communication path and the second communication path starting from the one first terminal of the master unit to the first slave unit connected via the first communication path in the direction of data transmission, from there on to the next slave unit connected via the first communication path in the direction of data transmission, until reaching a slave unit in the failure mode in the direction of data transmission via the first communication path, then from the slave unit in the failure mode back via the second communication path to the one second terminal of the master unit, from the one second terminal of the master unit to the further second terminal of the master unit, from the further second terminal of the master unit to the first slave unit connected via the second communication path in the direction of data transmission, from there on to the next slave unit connected via the second communication path in the direction of data transmission, until reaching a slave unit in the failure mode connected via the second communication path in the direction of data transmission, then from the slave unit in failure mode back via the first communication path to the further first terminal of the master unit.

According to some embodiments of the present invention, a communication system comprises first and second terminals of a master unit and a plurality of slave units which are each connected to a first and a second ring structure via a first and a second communication path. In normal operation, a ring-shaped data transmission is carried out via the first communication path starting from a first terminal of the master unit to the first slave unit connected via the first communication path in the direction of transmission, from there to the next slave unit connected via the first communication path in the direction of transmission, up to the last slave unit connected via the first communication path in the direction of transmission and then to a further first terminal of the master unit. In a failure mode, a loop-shaped data transmission is carried out via the first communication path and the second communication path starting from the one first terminal of the master unit to the slave unit connected via the first communication path in the direction of transmission, from there to the next slave unit connected via the first communication path in the direction of transmission, until reaching a slave unit in failure mode connected via the first communication path in the direction of transmission, then from the slave unit in failure mode back via the second communication path to the one second terminal of the master unit, from the one second terminal of the master unit to the further second terminal of the master unit, from the further second terminal of the master unit to the first slave unit connected via the second communication path in the direction of transmission, from there to the next slave unit connected via the second communication path in the direction of transmission until reaching a slave unit in failure mode connected via the second communication path in the direction of transmission, and then from the slave unit in failure mode back via the first communication path to a further first terminal of the master unit.

By the inventive arrangement of embodiments of the present invention, a high failure tolerance in the case of an interruption of the regular communication path, e.g. in the case of a broken line or a failure of a slave unit, is achieved with a minimum of hardware and switching complexity and thus reduced costs. According to the present invention, a double-ring topology is used in the communication system, however, in some embodiments, the master unit may only comprise one transmitting and receiving unit, as in a single-ring structure.

In normal operation, data transmission is carried out via the first regular communication path, whereby the data packets, starting from the transmitting unit of the master unit, consecutively cycle through all slave units serially connected to the regular communication path and are then fed back to the receiving unit of the master unit. If the regular communication path is interrupted, a failure mode is triggered in the communication system, in which a loop-shaped data transmission is carried out via the regular communication path and the second replacement communication path with the master unit at the cross point, whereby the data packets consecutively cycle through the slave units starting from the transmitting unit of the master unit via the regular communication path up to a slave unit arranged ahead of the point of interruption within the regular communication path. This slave unit short-circuits the regular communication path with the replacement communication path so that the data packets are fed back via the replacement communication path to the one second terminal of the master unit. The master unit short-circuits the one second terminal to the replacement communication path with the further second terminal to the replacement communication path and then transmits the data packets via the further second terminal of the replacement communication path through the slave units connected thereto, again up to slave unit arranged ahead of the point of interruption in the regular communication path. This slave unit connects the replacement communication path to the regular communication path, so that the data packets are fed back to the receiving unit of the master unit on the regular communication path.

The failure tolerance functionality is effectuated by slave coupling units in the two slave units adjacent to the point of interruption in the regular communication path and/or by a master coupling unit in the master unit which automatically reconfigure the transmission path in the communication system if link failures occur in the regular communication path.

According to some embodiments of the present invention, the master unit comprises two first terminals connected to the first regular communication path and two second terminals connected to the second replacement communication path. The transmitting unit and the receiving unit are connected to the two first terminals for transmitting data signals and for receiving data signals. The master coupling unit of the master unit short-circuits the two second terminals in the first regular communication path in the case of a failure mode, i.e. if a link fault occurs, so that a loop-shaped data transmission may take place via the first and the second communication path.

By the inventive configuration of embodiments of the master unit in accordance with the present invention, it is thus possible to use a master unit comprising only one transmitting and receiving unit in the double-ring structure, as it is also employed in the single-ring architecture. Additionally, terminals for the second ring structure and a master coupling unit are then provided connecting the second terminals of the second ring structure in the case of a link fault on the first ring structure to carry out a reconfiguration of the data transmission path.

DETAILED DESCRIPTION

Figure 1A:
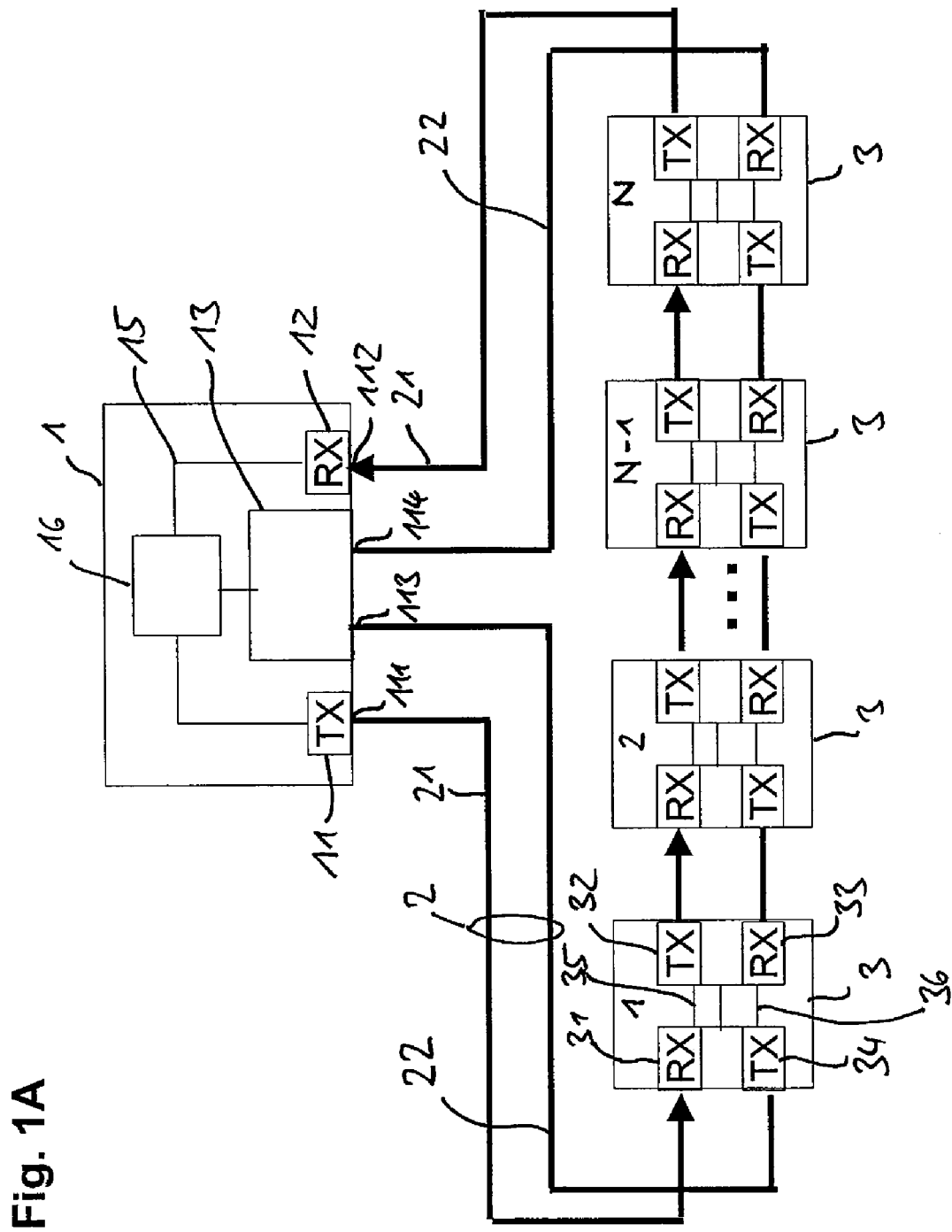
FIG. 1A is a schematic view of an embodiment of a communication system in accordance with the present invention comprising a master/slave structure, a master unit being serially connected to slave units via a double-ring structure, and depicts a normal mode.

With regard to fastening, mounting, attaching or connecting components of the present invention, unless specifically described as otherwise, conventional mechanical fasteners and methods may be used. Other appropriate fastening or attachment methods include adhesives, welding and soldering. Suitable electrical components and circuitry, wires, wireless components, chips, boards, microprocessors, inputs, outputs, displays, control components, etc. may be used. Generally, unless otherwise indicated, the materials for making the invention and/or its components may be selected from appropriate materials such as metal, metallic alloys, ceramics, plastics, etc.

In automation technology, field bus systems are increasingly used in which distributed devices of the machine periphery communicate with automation, engineering and visualization systems via a field bus. Typically, the field bus system comprises a serial bus which may e.g. be an electric line, an optical fiber or a radio cable. All bus subscribers are connected to this field bus, whereby a differentiation is made between active and passive bus subscribers. The active bus subscribers in the field bus system are the master units controlling data transmission on the bus. Such a master unit is e.g. an industrial PC serving as a process host computer of a production line. The master unit comprises a bus access authorization and may issue data onto the field bus without an external request. The passive subscribers to the bus system are peripheral machine devices such as I/O devices, valves, drives and transducers. They serve as slave units and do not possess a bus access authorization, i.e. they can only accept received data signals or transmit data signals to a master unit upon its request.

As a communication standard for transmitting data in the master/slave communication system, the Ethernet concept may be used. In Ethernet communication systems the data to be transmitted are encapsulated by a predetermined format in the form of data packets, in the following also referred to as telegrams. The Ethernet telegrams may thereby have a data length of up to 1500 Bytes, comprising control data having a start code, a target and source address, the data packet type and a failure mechanism, in addition to the user data.

Ethernet communication systems comprising a master/slave structure may be configured such that the individual slave units are connected via the transmission medium to form a chain, each slave unit being connected to two neighbors, the first and the last slave unit in the chain being thereby connected to the master unit, thus forming a ring structure. Data transmission is carried out in one direction starting from the master unit to the first adjacent slave unit and from there to the next up to the last slave unit and then back to the master unit.

To guarantee a high failure tolerance, e.g. in the case of link faults in the communication system, i.e. if entire transmission sections in the slave units fail, e.g. due to a broken cable, master/slave communication systems may comprise a second replacement communication path connecting the master units to the slave units to form a further ring structure.

Figure 1B:
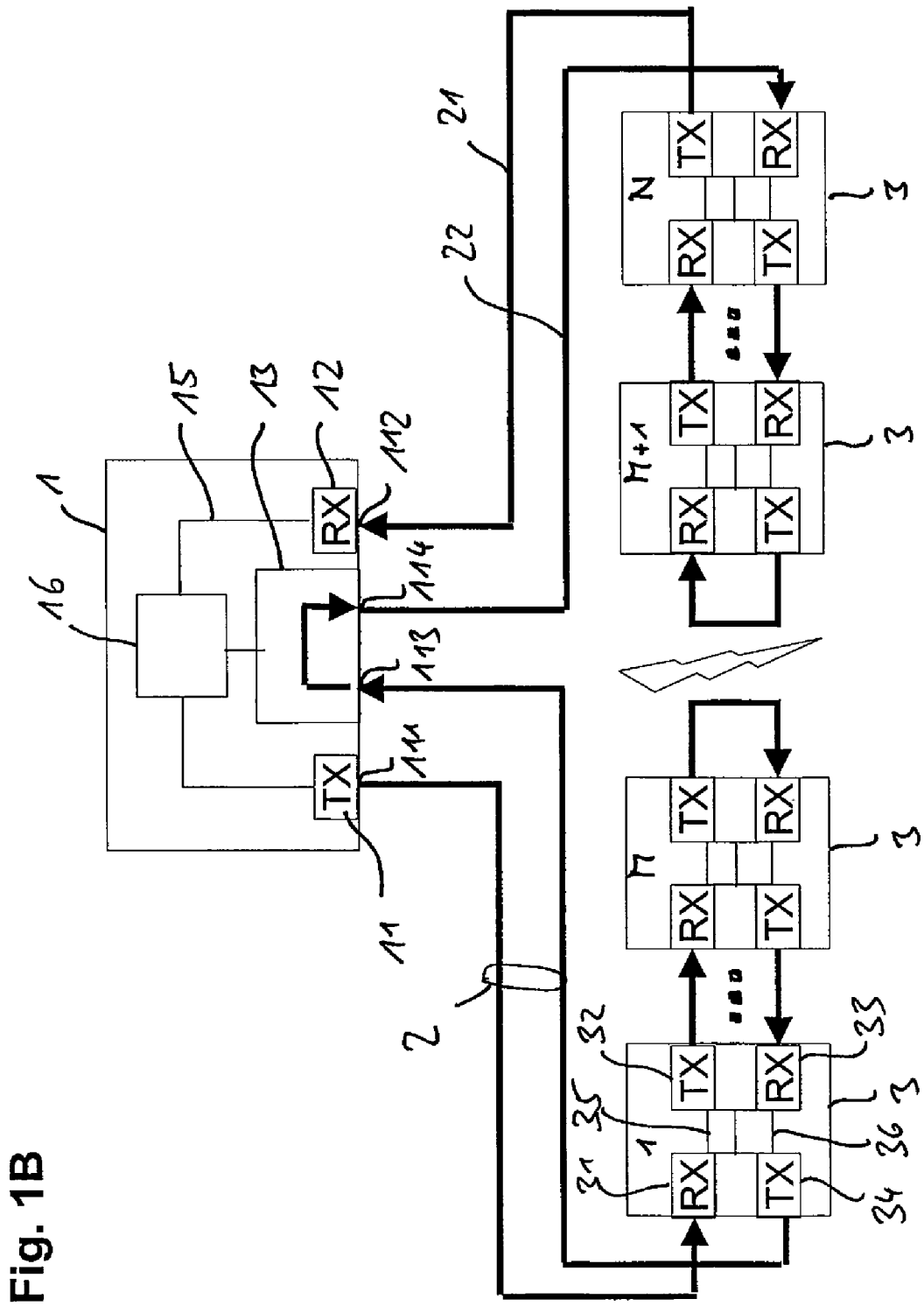
FIG. 1B depicts the system of FIG. 1A and a first communication system reconfiguration mode on the occurrence of a link fault.
Figure 1C:
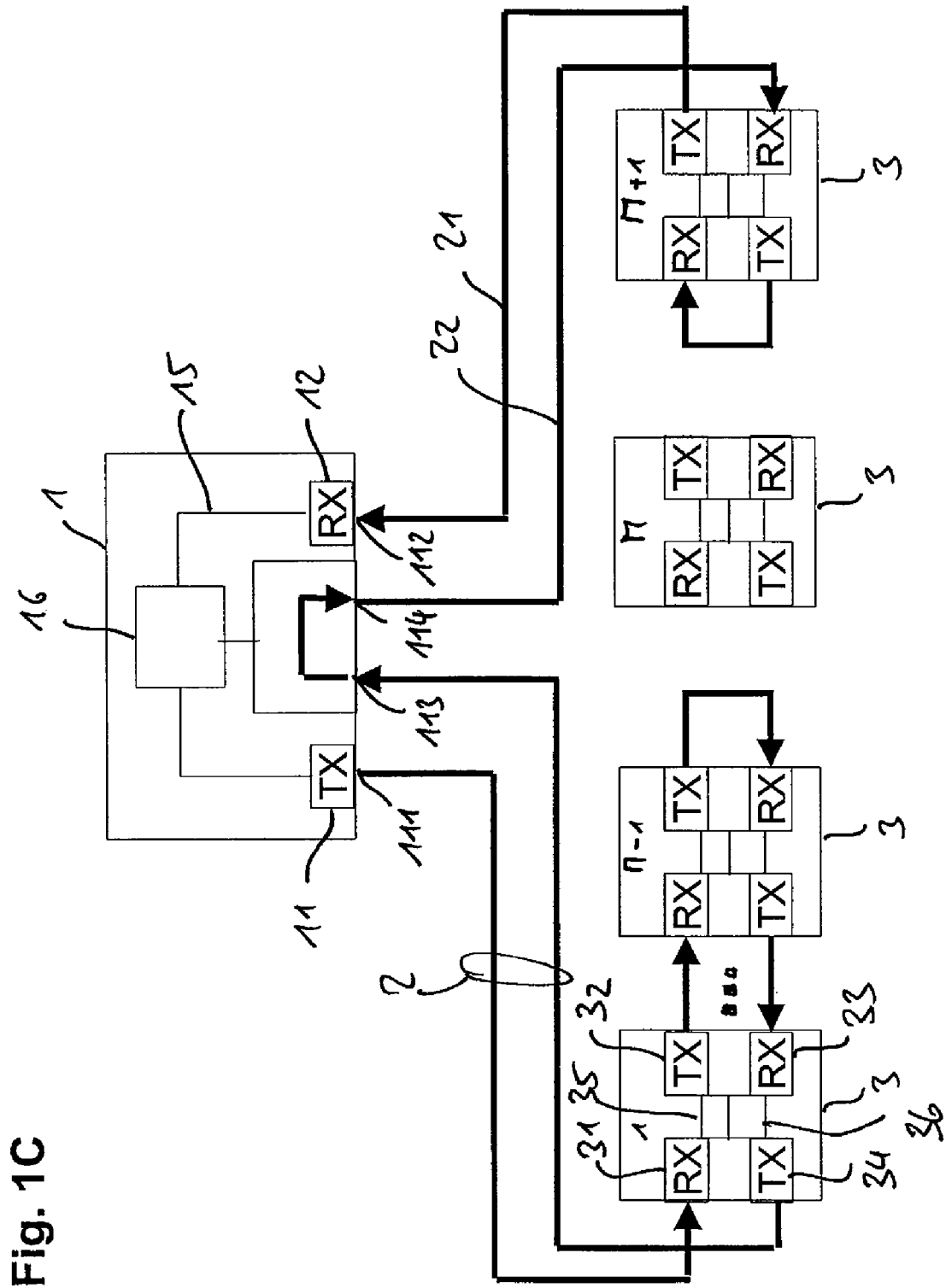
FIG. 1C depicts the system of FIG. 1A and a second communication system reconfiguration mode during failure of a slave unit.

FIGS. 1A, 1B and 1C show an embodiment of a failure-tolerant master/slave communication system in simplified diagrams, FIG. 1A showing a normal mode, FIG. 1B showing a first reconfiguration mode in the case of a link fault and FIG. 1C illustrating a second reconfiguration mode in the case of a failing slave unit. The communication system comprises a master unit 1 being serially connected to N slave units 3 via a double-ring structure. The double-ring structure comprises two separate data transmission paths each connecting the master unit to the N slave units 3 and thus forming an independent communication path 21, 22. An electric line, an optical fiber or a radio cable may serve as transmission path.

The master unit 1 comprises a transmitting unit TX 11 and a receiving unit RX 12. The transmitting unit TX 11 is connected to one end of the first communication path 21 via a first terminal 111 and the receiving unit RX 12 is connected to the second end of the first communication path 21 via a second terminal 112. The master unit 1 further comprises a master coupling unit 13, which is connected to an end of the second communication path 22 via a third terminal 113 and a fourth terminal 114, respectively. The transmitting unit TX 11, the receiving unit RX 12 and the master coupling unit 13 are connected to a central control unit 16 of the master unit 1 via control lines 15.

Each slave unit 3 comprises a first terminal having a first receiving unit RX 31 for receiving the data packets from a previous subscriber via the first communication path 21 and a further first terminal having a first transmitting unit TX 32 for forwarding to the next subscriber via the first communication path 21. Furthermore, each slave unit 3 comprises a second terminal having a second receiving unit RX 33 for receiving the data packets from a previous subscriber via the second communication path 22 and a further second terminal having a second transmission unit TX 34 for forwarding to the subsequent subscribers via the second communication path 22. In each slave unit 3, a processing unit 35 and a slave coupling unit 36 are switched between the first receiving unit RX 31, the second receiving unit RX 32, the first transmission unit TX 33 and the second transmission unit TX 34.

Figure 2:
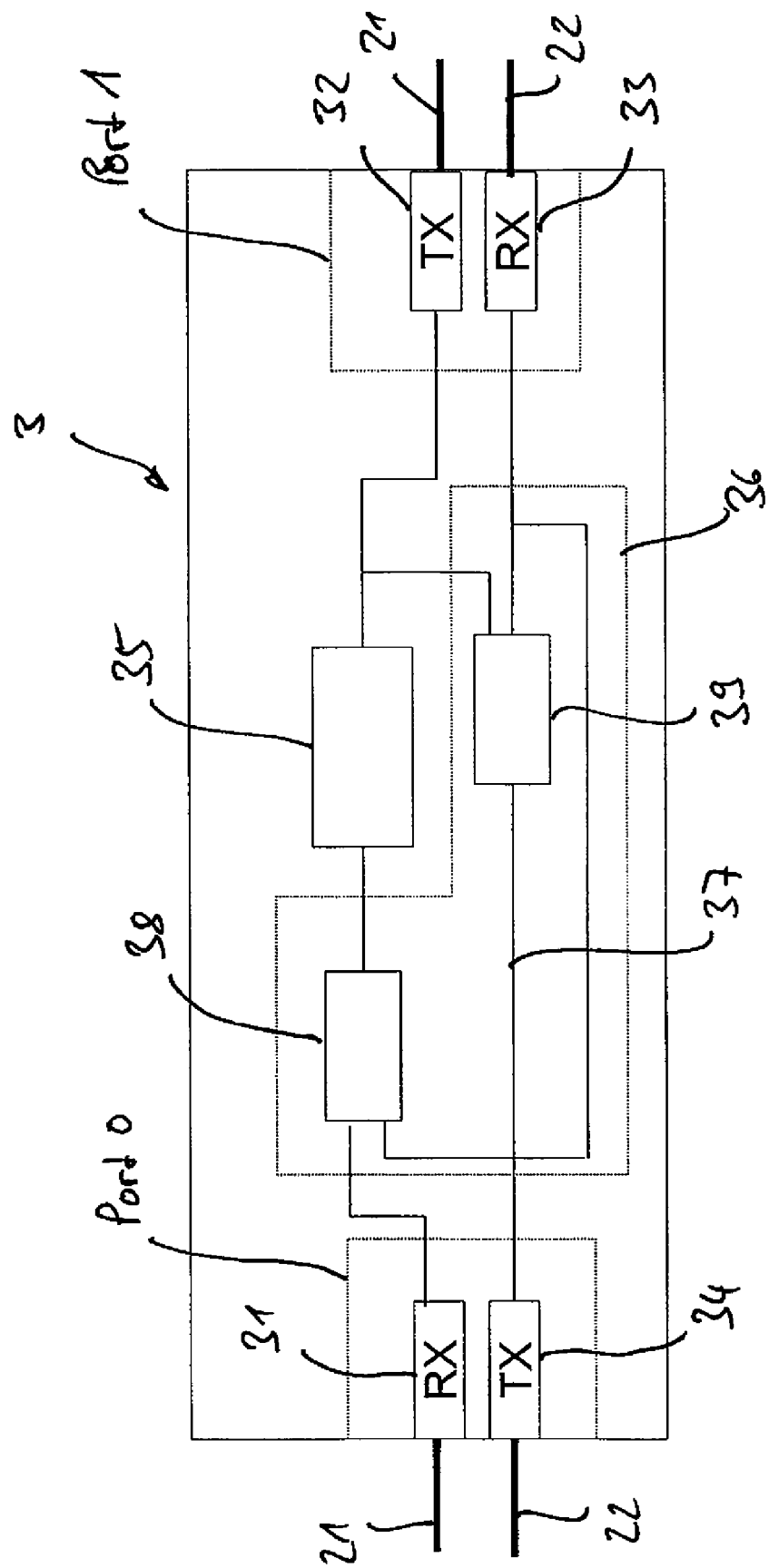
FIG. 2 is a schematic view of an embodiment of a slave unit.

A simplified diagram of one embodiment of a slave unit 3 is illustrated in FIG. 2. In the slave unit 3, the first receiving unit RX 31 which is connected to the first communication path 21, and the second transmitting unit TX 34 which is connected to the second communication path 22 are grouped as port 0. The second receiving unit RX 33 connected to the second communication path 22 and the first transmitting unit TX 32 connected to the first communication path 21 are grouped as port 1. The slave coupling unit 36 comprises a first change-over switch 38 and a second change-over switch 39, each being configured as a 2-1 multiplexer.

The receiving and transmitting units 31, 32, 33, 34, the multiplexer 38, 39, the slave coupling unit 36 and the processing unit 35 are connected to each other via a network of lines 37. The first receiving unit RX 31 is connected to the first input of the first multiplexer 38. The second input of the first multiplexer 38 is connected to the second receiving unit RX 33. The output of the first multiplexer 38 is furthermore connected to the processing unit 35. The second multiplexer 39 is in turn connected to the second receiving unit RX 33 via its first input and to the processing unit 35 via its second input. The output of the multiplexer 39 is connected to the second transmission unit TX 34. Furthermore, the processing unit 35 is connected to the first transmitting unit TX 32.

In a failure-free normal operation of the master/slave communication system as shown in FIG. 1A, a data packet generated by the central control unit 16 of the master unit 1 is outputted via the transmitting unit TX 11 and the one first terminal 111 on the first communication path 21. The telegram then cycles on the first communication path 21, whereby the slave units 3 connected downstream are cycled consecutively. The multiplexers 38, 39 of the slave coupling units 36 in the slave units 3 are switched in such a way that the processing unit 35 is connected to the first receiving unit RX 31 and to the first transmitting unit TX 32. After cycling through the last slave unit N, the data packet is fed back to the receiving unit RX 12 of the master unit 1 via the first communication path 21 and the further first terminal 112, the receiving unit RX 12 of the master unit 1 forwarding the received data packet to the central control unit 16 for evaluation.

In a failure-free normal mode, the two terminals 113, 114 of the master coupling unit 16 connected to the second communication path 22 are closed. Thus, the master unit 1 only sends telegrams via the first communication path 21, the telegrams being processed by the processing units 35 of the slave units 3 during the cycle. No data transmission takes place on the second communication path 22.

The master slave communication system shown in FIGS. 1A, 1B and 1C has the ability of reconfiguring itself in the case of a disturbance, if a link fault occurs in the first communication path 21, to maintain the data transmission within the system. If a link fault occurs in the first communication path 21, the two slave units adjacent to the faulty location automatically assume a failure mode in which the slave coupling unit 36 short-circuits the first and the second communication path 21, 22 to redirect the data packets from the one communication path to the other communication path. In parallel to the assuming of a failure mode by the slave units 3 adjacent to the link fault in the first communication path 21, the master unit 1 also assumes the failure mode by the master coupling unit 13 opening and short-circuiting the two terminals 113, 114, which are connected to the second communication path 22.

In failure mode, a loop-shaped data transmission then takes place via the first and second communication path 21, 22 starting from the transmitting unit RX 11 of the master unit 1 via the one first terminal 111 and the first communication path 21 to the first slave unit 3 connected via the first communication path 21 in the direction of data transmission. From there, data transmission then takes place to the next slave unit 3 connected via the first communication path 21, until a first slave unit in failure mode in the direction of data transmission is reached. In the first slave unit 3 in failure mode, the data packet is redirected to the second communication path 22 and then guided to the one second terminal 113 of the master coupling 13 via the second communication path and the slave units connected thereto.

In the master coupling unit 13, the data packet is then switched from the one second terminal 113 to the further second terminal 114 and forwarded to the first slave unit 3 connected via the second communication path 22 in the direction of data transmission. From there, the data packet is forwarded to the next slave unit 3 connected via the second communication path 22 in the direction of data transmission, until a second slave unit 3 in failure mode in the direction of data transmission is reached. The second slave unit in failure mode then sends the data packet via the first communication path 21 back to the further first terminal 112 of the receiving unit RX 12 of the master unit 1.

FIG. 1B shows a diagram of the data transmission (arrow) in the master/slave communication system in the case that a link fault occurs between the slave unit M and the slave unit M+1. The slave units 1 to M−1 and M+2 to N are in the normal operating mode, the slave units M and M+1 as well as the master unit 1, on the contrary, are in failure mode. FIG. 1C shows the reconfiguration of the data transmission (arrow) in the master slave communication system during a complete failure of the slave unit M, which is equivalent to the occurrence of two link faults between the slave unit M−1 and the slave unit M and between the slave unit M+1 and the slave unit M. The slave units 1 to M−2 and the slave units M+2 to N operate in normal mode. The slave units M−1 and M+1 as well as the master units 1 are in failure mode.

Reconfiguration on occurrence of a link fault is thereby triggered by the two ports 0, 1 of the slave units 3 adjacent to the link fault. The ports 0, 1 of the slave units 3 may determine by a recognition method if communication with the adjacent slave unit is possible via the two communication paths 21, 22. If a link fault is recognized by a port of the slave unit 3, a corresponding failure mode is triggered in the slave unit 3 by the slave coupling unit 36.

If a communication fault is determined by the port 1 of the slave unit 3 via the communication path 21, as it occurs in the link fault in the slave unit M shown in FIG. 1B and/or in the device failure in slave unit M−1 shown in FIG. 1C, the processing unit 35 is connected to the first receiving unit RX 31 and the second transmitting unit TX 34 by the slave coupling unit 36. The telegram arriving on the first communication path 21 in the slave unit 3 is thus fed back to the second communication path 22 via the processing unit 35. In the configuration of the slave coupling unit 36 in the slave unit 3 shown in FIG. 2, said redirection of the data packet is carried out upon processing by the processing unit 35 by switching the second input of the second multiplexer 39 to its output.

If a communication fault is determined by the port 0 of the slave unit 3 via the communication path 21, as it occurs in the link fault in the slave unit M+1 shown in FIG. 1B and in the device failure in slave unit M+1 shown in FIG. 1C, the processing unit 35 is connected to the second receiving unit RX 33 and to the first transmitting unit TX 32 by the slave coupling unit 36 in the slave unit 3, so that the telegram arriving on the second communication path 22 is fed back to the first communication path 21 upon processing by the processing unit 35. In the configuration of the slave coupling unit 36 of the slave unit 3 shown in FIG. 2, said redirection of the data packet is carried out upon processing by the processing unit 35 by the first multiplexer 39 switching its second input to its output.

The reconfiguration of the master unit 1 in failure mode may be triggered by the port of the master coupling unit 13 itself, as well. As soon as a data packet arrives on the second communication path 22, the port opens the second terminals 113, 114 and short-circuits them to forward the data packet on the second communication path 22 via the master unit 1. Alternatively, the failure mode of the master coupling unit 13 may also be triggered by the central control unit 16 of the master unit 1. As soon as the control unit 16 of the master unit 1 determines that the first communication path 21 is interrupted because the receiving unit TX 12 no longer receives any data packets, the central control unit 16 accesses the master coupling unit 13 in the previously described manner, i.e. the second terminals 113, 114 are opened and short-circuited to push data packets through the second communication path 22.

The inventive configuration and functionality of a master/slave communication system in accordance with the present invention provides the possibility of achieving a high failure tolerance of the data communication in case of link faults e.g., in the master unit, in a simple manner with low hardware and switching complexity. That is to say, in some embodiments, the master unit requires one transmitting unit and one receiving unit to operate the double ring structure. In some embodiments, the additionally provided master coupling unit allows for a reconfiguration of the data transmission via the replacement communication path, if the regular communication path is interrupted.

Embodiments of the present invention, including preferred embodiments, have been presented for the purpose of illustration and description. They are not intended to be exhaustive or to limit the invention to the precise forms and steps disclosed. The embodiments were chosen and described to provide the best illustration of the principles of the invention and the practical application thereof, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A communication system comprising a master unit and a plurality of slave units,
    wherein the master unit and the slave units each comprise
        two first terminals connected to a first communication path and two second terminals connected to a second communications path,
            wherein the first terminals of the master unit and the slave units are connected via the first communication path to form a first ring structure,
            wherein the second terminals of the master unit and the slave unit are connected via the second communication path to form a second ring structure,
        wherein the master unit comprises a transmitting unit connected to one first terminal for sending data signals, a receiving unit connected to the other first terminal for receiving data signals, and a master coupling unit configured to short-circuit the two second terminals in a failure mode of the master unit, the failure mode of the master unit being triggered by an occurrence of a link fault in the first communication path,
        wherein, in a normal mode of the master unit the two second terminals of the master unit connected to the second communication path are closed, so that the two second terminals are unconnected within the master unit and no data transmission takes place on the second communication path, and
        wherein, in the failure mode of the master unit the two second terminals of the master unit connected to the second communication path are opened and short-circuited by the master coupling unit, so that the two second terminals are directly connected to each other within the master unit in order to push data signals through the second communication path.

2. The communication system according to claim 1, wherein each slave unit comprises a slave coupling unit being configured to short-circuit the first communication path and the second communication path between the first terminals and the second terminals in a failure mode of the slave unit, the failure mode of the slave unit being triggered by an occurrence of a data transfer failure to the adjacent slave unit connected downstream in the direction of the data transfer.

3. The communication system according to claim 2, wherein the master unit is configured to determine the initialization of the failure mode of a slave unit and to trigger the failure mode of the master unit.

4. The communication system according to claim 1, wherein each slave unit comprises
    a processing unit for processing data signals, the slave coupling unit switching the processing unit between the first terminals connected to the first communication path in a normal mode of the slave unit and between the first terminals connected to the first communication path and the second terminals connected to the second communication path in the failure mode of the slave unit.

5. A master unit comprising:
    two first terminals connected to a first communication path,
    two second terminals connected to a second communication path,
    a transmitting unit connected to one of the two first terminals, for transmitting data signals,
    a receiving unit connected to the other first terminal for receiving data signals, and
    a master coupling unit configured to short-circuit the two second terminals in a failure mode of the master unit, the failure mode of the master unit being triggered by an occurrence of a link fault in the first communication path,
wherein, in a normal mode of the master unit the two second terminals of the master unit connected to the second communication path are closed, so that the two second terminals are unconnected within the master unit and no data transmission takes place on the second communication path, and
wherein, in the failure mode of the master unit the two second terminals of the master unit connected to the second communication path are opened and short-circuited by the master coupling unit, so that the two second terminals are directly connected to each other within the master unit in order to push data signals through the second communication path.

6. The master unit according to claim 5, wherein the master unit is configured to determine a data transmission failure on the first communication path and to trigger the failure mode of the master unit.

7. A method for operating a communication system comprising a master unit and a plurality of slave units, the master unit and the slave units each comprising two first terminals connected to a first communication path and two second terminals connected to a second communication path, the first terminals of the master unit and of the slave units being connected via the first communication path to form a first ring structure, the second terminals of the master unit and of the slave units being connected via the second communication path to form a second ring structure wherein, in a normal mode of the master unit the two second terminals of the master unit connected to the second communication path are closed, so that the two second terminals are unconnected within the master unit and no data transmission takes place on the second communication path, and wherein, in the failure mode of the master unit the two second terminals of the master unit connected to the second communication path are opened and short-circuited, so that the two second terminals are unconnected within the master unit, the methods comprising the steps of:

carrying out a ring-shaped data transmission in a normal mode of the master unit via the first communication path starting from the one first terminal of the master unit to the first slave unit connected via the first communication path in the direction of data transmission, from there to the next slave unit connected via the first communication path in the direction of data transmission up to the last slave unit connected via the first communication path in the direction of data transmission and then on to the further first terminal of the master unit, and performing a loop-shaped data transmission in the failure mode of the master unit via the first communication path and the second communication path starting from the one first terminal of the master unit to the first slave unit connected via the first communication path in the direction of data transmission, from there on to the next slave unit connected via the first communication path in the direction of data transmission, until reaching a slave unit in a failure mode in the direction of data transmission via the first communication path, then from the slave unit in the failure mode back via the second communication path to the one second terminal of the master unit, from the one second terminal of the master unit to the further second terminal of the master unit, from the further second terminal of the master unit to the first slave unit connected via the second communication path in the direction of data transmission, from there on to the next slave unit connected via the second communication path in the direction of data transmission, until reaching a slave unit in a failure mode connected via the second communication path in the direction of data transmission, then from the slave unit in failure mode back via the first communication path to the further first terminal of the master unit.

8. The method according to claim 7, the slave unit determining a data transmission failure to the adjacent slave unit connected downstream in the direction of data transmission and triggering the failure mode of the slave unit.

9. The method according to claim 8, the master unit determining the start of the failure mode of a slave unit and triggering the failure mode of the master unit.

* * * * *